United States Patent
Le Bars

(10) Patent No.: US 9,607,122 B2
(45) Date of Patent: Mar. 28, 2017

(54) TIMING DRIVEN CLOCK TREE SYNTHESIS

(71) Applicant: Mentor Graphics Corporation, Wllsonville, OR (US)

(72) Inventor: Vincent Le Bars, Newark, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/168,363

(22) Filed: Jan. 30, 2014

(65) Prior Publication Data

US 2015/0213186 A1    Jul. 30, 2015

(51) Int. Cl.
*G06F 17/50*      (2006.01)

(52) U.S. Cl.
CPC ................................ *G06F 17/5081* (2013.01)

(58) Field of Classification Search
CPC .... G06F 1/10; G06F 17/5031; G06F 17/5045; G06F 17/5059; G06F 17/5081
USPC ................. 716/100, 104, 108, 110, 113–114
See application file for complete search history.

(56) References Cited

U.S. PATENT DOCUMENTS

| | | | |
|---|---|---|---|
| 6,550,045 B1* | 4/2003 | Lu ....................... | G06F 17/5045 716/114 |
| 6,698,006 B1 | 2/2004 | Srinivasan | |
| 8,572,532 B1* | 10/2013 | Singh ..................... | G06F 17/505 716/107 |
| 2005/0268263 A1* | 12/2005 | Sun et al. ......................... | 716/6 |
| 2006/0136852 A1* | 6/2006 | Bourgin .............. | G06F 17/5045 716/114 |
| 2008/0129362 A1* | 6/2008 | Kawai ................. | G06F 17/5031 327/292 |
| 2008/0276208 A1* | 11/2008 | Albrecht et al. ................... | 716/6 |
| 2010/0070941 A1* | 3/2010 | Sircar ................... | G06F 17/505 716/113 |
| 2012/0284680 A1* | 11/2012 | Iyer ..................... | G06F 17/5031 716/113 |

OTHER PUBLICATIONS

Kothari, "'Useful' Skew-Based Optimization," SOCcentral.com at http://www.soccentral.com/PrintPage.asp?PassedEntryID=31340, (May 20, 2010).

* cited by examiner

*Primary Examiner* — Paul Dinh
(74) *Attorney, Agent, or Firm* — Mentor Graphics Corporation

(57) ABSTRACT

This application discloses performing a static timing analysis on a circuit design with an unbalanced clock tree, for example, to determine data arrival timing and clock arrival timing at multiple clock-driven circuits in a circuit design, and then performing clock tree synthesis on the circuit design to initially balance the unbalanced clock tree based, at least in part, on the data arrival timing relative to the clock arrival timing at the multiple clock-driven circuits. The clock tree after initial balancing includes a clock signal path configured to provide a clock signal to each of the multiple clock-driven circuits with a new clock arrival timing that corresponds to the data arrival timing.

17 Claims, 7 Drawing Sheets

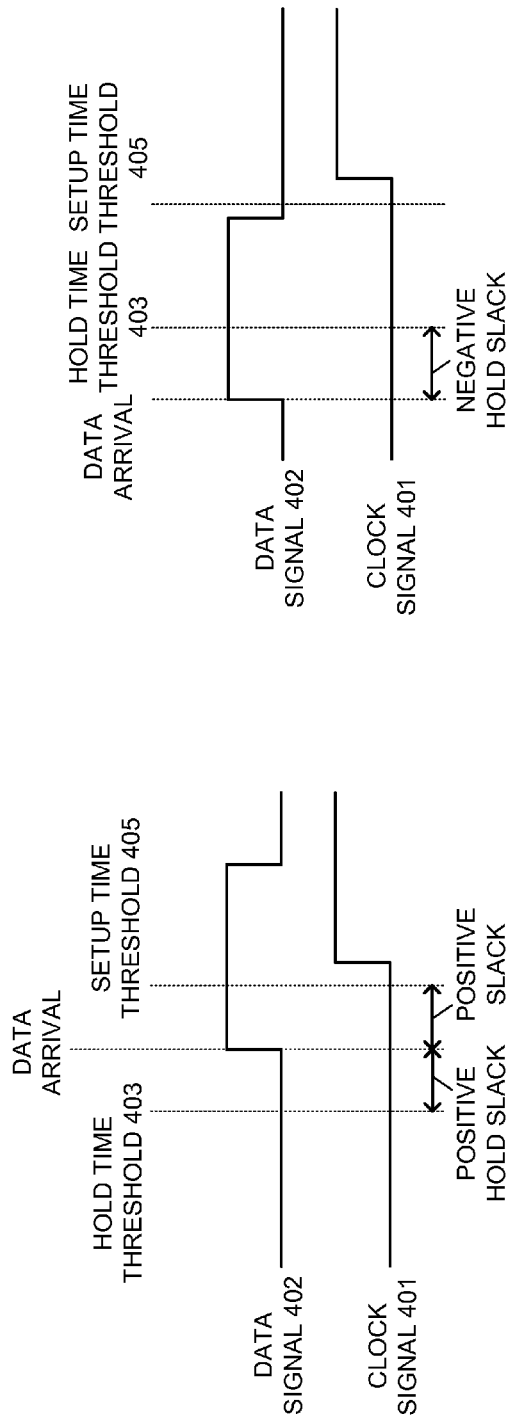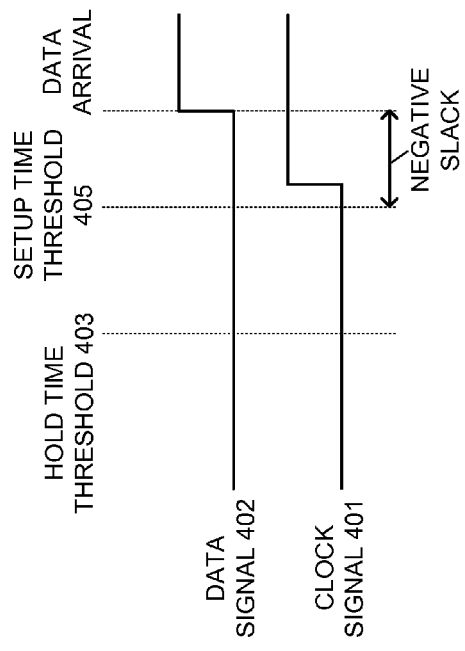

TIMING DRIVEN CLOCK TREE SYNTHESIS

TECHNICAL FIELD

This application is generally related to electronic design automation and, more specifically, to performing timing driven clock tree synthesis.

BACKGROUND

Microdevices, such as integrated microcircuits and microelectromechanical systems (MEMS), are used in a variety of products, from automobiles to microwaves to personal computers. Designing and fabricating microdevices typically involves many steps, known as a "design flow." The particular steps of a design flow often are dependent upon the type of microcircuit, its complexity, the design team, and the microdevice fabricator or foundry that will manufacture the microcircuit. Typically, software and hardware "tools" verify the design at various stages of the design flow by running software simulators and/or hardware emulators, and errors in the design are corrected or the design is otherwise improved.

Several steps are common to most design flows for digital integrated microcircuits. Initially, the specification for a new circuit is transformed into a logical design, sometimes referred to as a register transfer level (RTL) description of the circuit. With this logical design, the circuit can be described in terms of both the exchange of signals between hardware registers and the logical operations that can be performed on those signals. The logical design typically employs a Hardware Design Language (HDL), such as the Very high speed integrated circuit Hardware Design Language (VHDL). As part of the creation of a logical design, a designer will also implement a place-and-route process to determine the placement of the various portions of the circuit, along with an initial routing of interconnections between those portions. The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices, such as transistors, resistors, and capacitors, which will be used in the circuit, along with their interconnections. This device design generally corresponds to the level of representation displayed in conventional circuit diagrams. Preliminary timing estimates for portions of the circuit may be made at this stage, using an assumed characteristic speed for each device. In addition, the relationships between the electronic devices are analyzed, to confirm that the circuit described by the device design will correctly perform the desired functions. This analysis is sometimes referred to as "formal verification."

Once the relationships between circuit devices have been established, the design can be again transformed, this time into a physical design that describes specific geometric elements. This type of design often is referred to as a "layout" design. The geometric elements, which typically are polygons, define the shapes that will be created in various materials to manufacture the circuit. Typically, a designer will select groups of geometric elements representing circuit device components, e.g., contacts, gates, etc., and place them in a design area. These groups of geometric elements may be custom designed, selected from a library of previously-created designs, or some combination of both. Once the groups of geometric elements representing circuit device components have been placed, geometric elements representing connection lines then are then placed between these geometric elements according to the predetermined route. These lines will form the wiring used to interconnect the electronic devices.

Typically, a designer will perform a number of analyses on the resulting layout design data. For example, with integrated circuits, the layout design may be analyzed to confirm that it accurately represents the circuit devices and their relationships as described in the device design. The layout design also may be analyzed to confirm that it complies with various design requirements, such as minimum spacings between geometric elements. Still further, the layout design may be modified to include the use of redundant geometric elements or the addition of corrective features to various geometric elements, to counteract limitations in the manufacturing process, etc. For example, the design flow process may include one or more resolution enhancement technique (RET) processes, that modify the layout design data to improve the usable resolution of the reticle or mask created from the design in a photolithographic manufacturing process.

After the layout design has been finalized, it is converted into a format that can be employed by a mask or reticle writing tool to create a mask or reticle for use in a photolithographic manufacturing process. The written masks or reticles then can be used in a photolithographic process to expose selected areas of a wafer to light or other radiation in order to produce the desired integrated microdevice structures on the wafer.

Returning to the place-and-route process, this process typically begins with a circuit design described at a register transfer level. Using a place-and-route tool, a designer can place portions of the circuit design relative to each other in a geographic design environment. While these circuit design portions can correspond to segments of code in a hardware description language, they typically are represented in the geographic design environment as blocks. Once the blocks have been placed relative to each other, wiring lines can be routed between the blocks. These wiring lines represent the interconnections, such as data signal interconnections and clock signal interconnections, which will be formed between the components of the electrical device.

The routing of these wiring lines typically takes place in two stages: a coarse or track routing stage, in which groups of wires are routed together between blocks, and detailed routing where the position and buffering of individual wires are adjusted. For clock signal interconnections, the first routing stage often includes generating a clock tree in the circuit design. While the clock tree can propagate a clock signal from a root clock source to each clock-driven circuit in the circuit design, the clock tree generated in the first routing stage is often unbalanced due to transmission delays associated with variable distances that the clock signal travels through the clock tree to the various clock-driven circuits.

The second routing stage for clock signal interconnections is typically an iterative process, with repeated performance of clock tree synthesis (CTS) to alter the timing of the clock signaling in the circuit design. Conventionally, the initial performance of clock tree synthesis alters the clock tree to eliminate or minimize skew between clock signals, i.e., having the clock tree synchronously provide clock signals to each clock-driven circuit in the circuit design. After the clock tree has eliminated or minimized skew in the circuit design, at least one subsequent clock tree synthesis can be performed to selectively modify the clock tree to synchronize the timing of the clock signals with the timing of data signals in the circuit design. Although this selective clock tree modification can introduce a small amount of skew, it is often called useful skew, because it adds the skew to the circuit design in order to accommodate various data path delays between the clock-driven circuits.

SUMMARY

This application discloses tools and mechanisms for performing timing driven clock tree synthesis on a circuit design. According to various embodiments, the tools and mechanisms can perform a static timing analysis on a circuit design with an unbalanced clock tree, for example, to determine data arrival timing and clock arrival timing at multiple clock-driven circuits in a circuit design, and then perform clock tree synthesis on the circuit design to initially balance the unbalanced clock tree based, at least in part, on the data arrival timing relative to the clock arrival timing at the multiple clock-driven circuits. The clock tree after initial balancing includes a clock signal path configured to provide a clock signal to each of the multiple clock-driven circuits with a new clock arrival timing that corresponds to the data arrival timing.

DESCRIPTION OF THE DRAWINGS

FIGS. 4A-4D illustrate timing diagrams showing various slack characterizations.

DETAILED DESCRIPTION

Illustrative Operating Environment

The execution of various electronic design automation processes according to embodiments of the invention may be implemented using computer-executable software instructions stored on one or more storage devices, one or more programmable computing devices executing computer-executable software instructions, or some combination thereof. Because these embodiments of the invention may be implemented through software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

Figure 1:
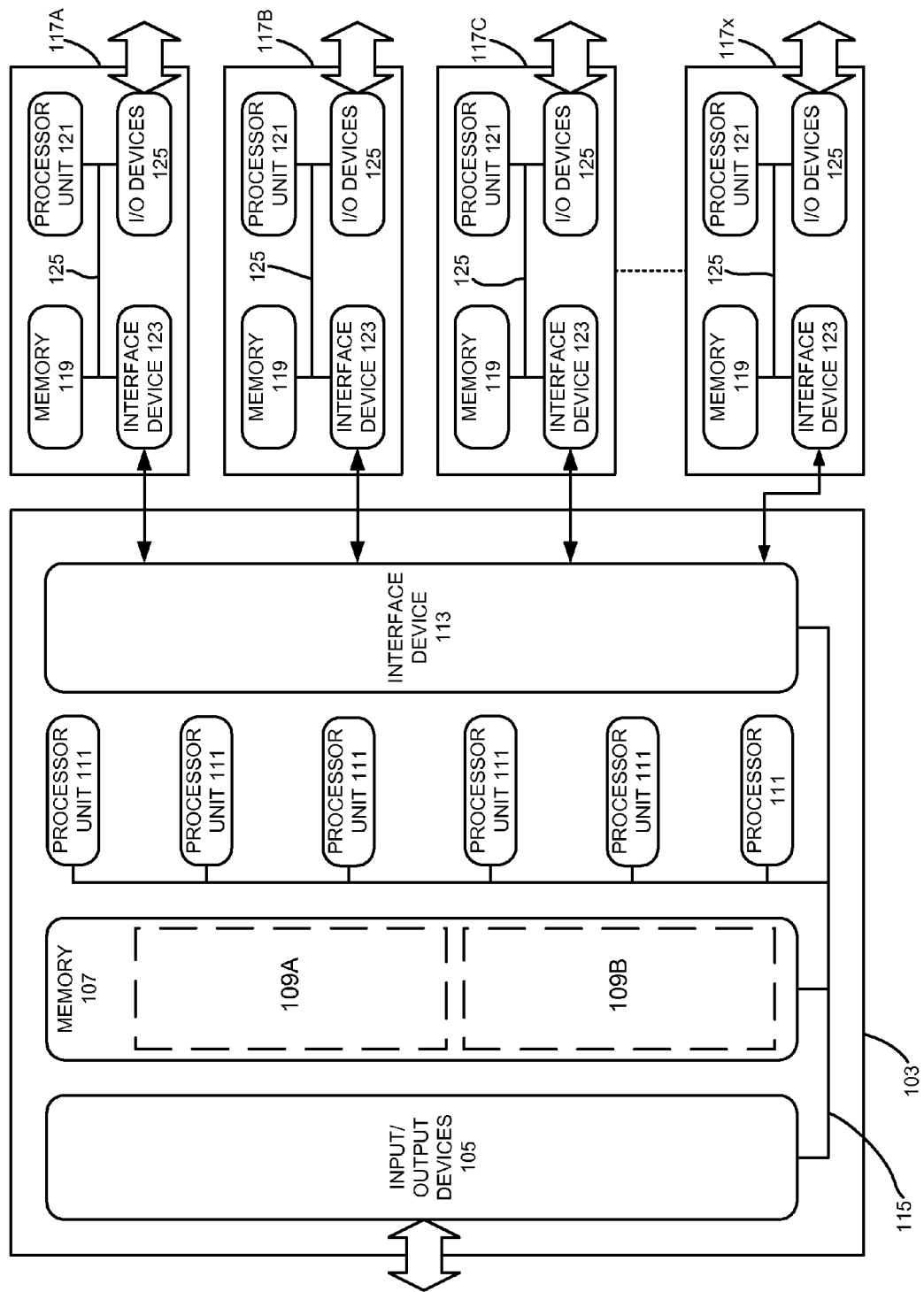
FIGS. 1 and 2 illustrate an example of a computer system of the type that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
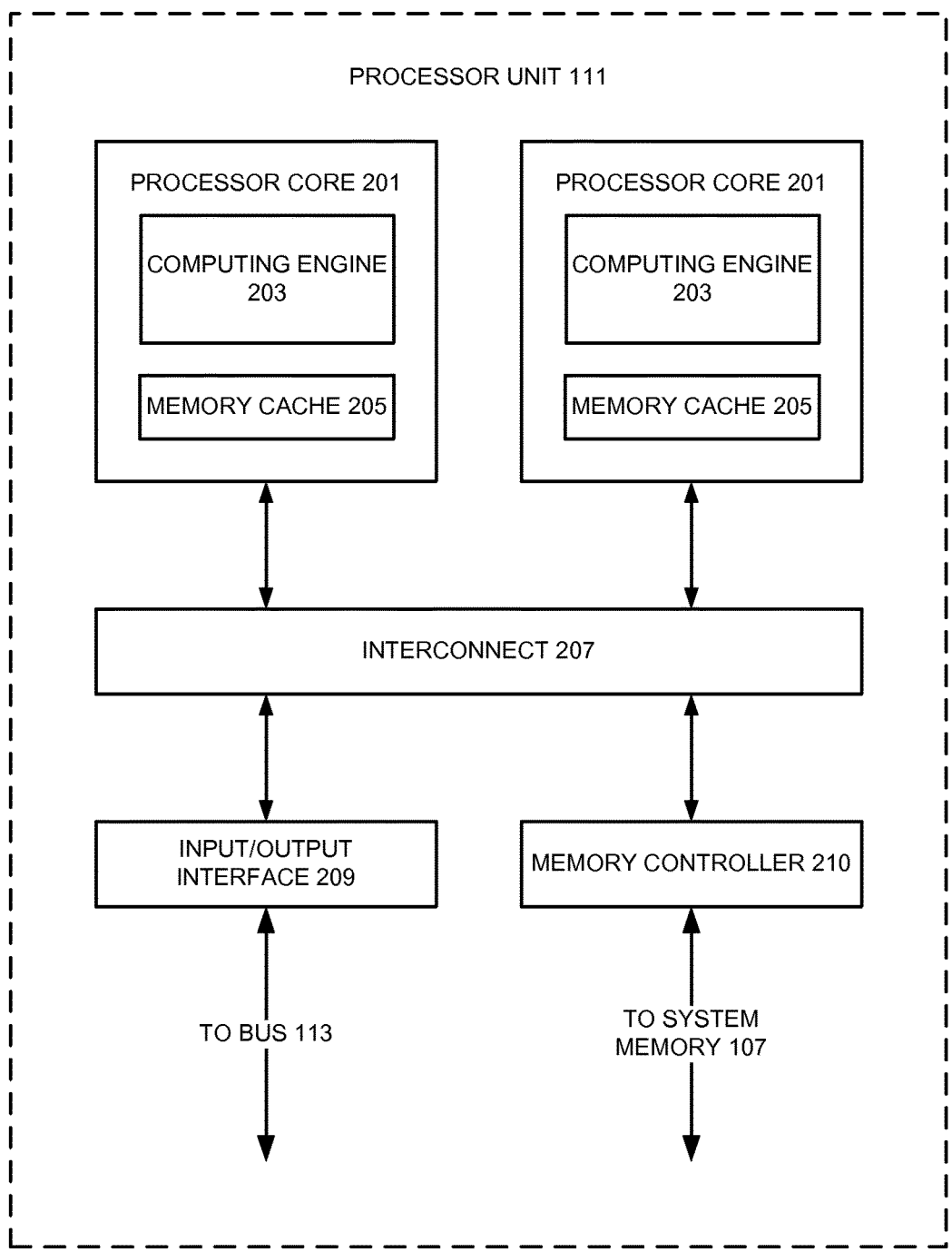

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Timing Driven Clock Tree Synthesis

Figure 3:
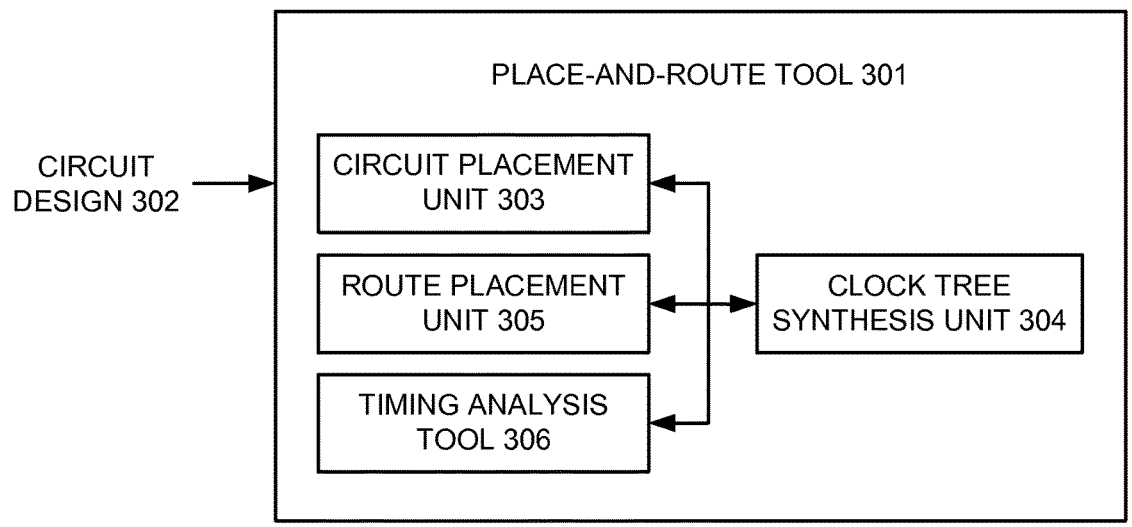
FIG. 3 illustrates an example of a place-and-route tool including a clock tree synthesis unit that may be implemented according to various embodiments of the invention.

FIG. 3 illustrates an example of a place-and-route tool 301 including a clock tree synthesis unit 306 that may be implemented according to various embodiments of the invention. Referring to FIG. 3, the place-and-route tool 301 can receive a circuit design 302, which can describe an electronic device both in terms of an exchange of data signals between clock-driven circuits in the electronic device, such as hardware registers, flip-flops, or the like, and in terms of logical operations that can be performed on the data signals by combinational logic in the electronic device. The circuit design 302 can model the electronic device at a register transfer level (RTL), for example, with code in a hardware description language (HDL), such as Verilog, Very high speed integrated circuit Hardware Design Language (VHDL), or the like.

The place-and-route tool 301 can include a circuit placement unit 303 to utilize the circuit design 302 to place the clock-driven circuits and the combinational logic relative to each other in a design environment. While the clock-driven circuits and the combinational logic can correspond to segments of code in the hardware description language, in some embodiments, the clock-driven circuits and the combinational logic can be represented as blocks in a geographic version of the design environment.

The place-and-route tool 301 can include a route placement unit 305 to place wiring lines in the design environment between components of the electronic device defined by the circuit design 302. The wiring lines can include data wiring lines to implement data signal interconnections or data paths between the clock-driven circuits and the combinational logic of the electronic device. The wiring lines also can include a network of clock wiring lines, known as a clock tree, to implement clock signal interconnections or clock signal paths between a root clock source device and each of the clock-driven circuits of the electronic device.

The route placement unit 305 can include a clock tree synthesis unit 306 to perform clock tree synthesis (CTS) and generate the clock tree, which can distribute a clock signal from the root clock source device to each of the clock-driven circuits. In some embodiments, the root clock source device can be located in the electronic device and described as a component of the electronic device in the circuit design 302, while in other embodiments, the root clock source device can provide the clock signal to the electronic device through an input/output (I/O) interface or pin.

As will be described below in detail, the clock tree synthesis unit 306 can generate the clock tree in multiple stages—a first stage to generate an unbalanced clock tree for placement in the design environment and one or more subsequent stages to balance or optimize the unbalanced clock tree. In some embodiments, the clock tree synthesis unit 306, in the first stage, can adjust the unbalanced clock tree for a maximum transition delay, or the delay associated with transitions of the clock signal between a low-level and a high-level.

While the unbalanced clock tree can provide clock signal paths for the propagation of clock signals to each of the clock-driven circuits, these clock signals arrive at the clock-driven circuits with various amounts of clock skew and slack, for example, due to transmission delays associated with variable distances that the clock signals travel through the unbalanced clock tree to the clock-driven circuits. Clock skew can be a measure of synchronization in clock signal arrival times at different clock-driven circuits. For example, two clock signals that arrive at their respective clock-driven circuits at the different times can be said to have clock skew with a magnitude corresponding to the arrival time difference between the two clock signals at their respective clock-driven circuits. Slack can be a measure of synchronization between clock and data signal arrival times at each of the clock-driven circuits, which will be described below with reference to FIGS. 4A-4D in greater detail.

FIGS. 4A-4D illustrate timing diagrams showing various slack characterizations. Referring to FIGS. 4A-4D, the timing diagrams show slack characterizations—positive slack, negative slack, and negative hold slack—for different data signal arrival times at a clock-driven circuit relative to an arrival of a clock signal 401 (or transition in the clock signal 401) at the clock-driven circuit.

Figure 4A:
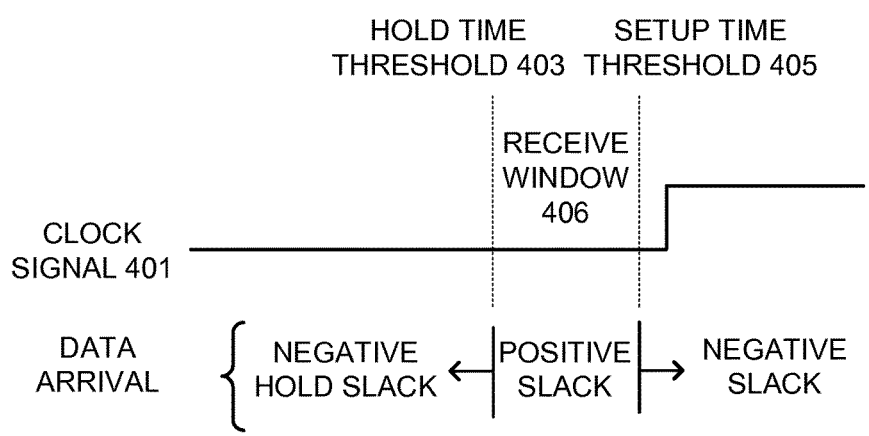

A positive slack characterization, as shown in FIGS. 4A and 4B, indicates that the clock-driven circuit was able to latch the data signal 402 in response to the clock signal 401 (or transition in the clock signal 401). Since the clock-driven circuit can latch the data signal 402 when the data signal 402 has had an adequate time to setup or stabilize prior to the arrival of the clock signal 401 (or transition in the clock signal 401) and when the data signal 402 holds its value for an adequate time after the arrival of the clock signal 401 (or transition in the clock signal 401), the clock-driven circuit can have a receive window 406 for the arrival of the data signal 402, which can be bounded by a hold time threshold 403 and a setup time threshold 405.

The hold time threshold 403 can identify a time, before which, a data signal 402 may be deemed to have arrived too early for the clock-driven circuit to latch, for example, as the data signal 402 may not retain or hold its value, such as a high-level or a low-level, for an adequate hold time after to the arrival of the clock signal 401 (or transition in the clock signal 401). In some embodiments, the hold time threshold 403 may be located at a time corresponding to the arrival of the clock signal 401 (or transition in the clock signal 401) plus the adequate hold time for the data signal 402 minus a total time the data signal 402 remains at a low-state or remains at a high-state during one period of the data signal 402.

The setup time threshold 405 can identify a time, after which, a data signal 402 may be deemed to have arrived too late for the clock-driven circuit to latch, for example, as the data signal 402 may not have adequate time to setup or stabilize prior to the arrival of the clock signal 401 (or transition in the clock signal 401). In some embodiments, the setup time threshold 405 can be located at a time corresponding to the arrival of the clock signal 401 (or transition in the clock signal 401) minus a setup time for the data signal 402 in the clock-driven circuit.

When the clock-driven circuit receives a data signal 402 too early, for example, before a hold time threshold 403, as shown in FIGS. 4A and 4C, the clock-driven circuit can be characterized as having negative hold slack. The magnitude of the negative hold slack can correspond to a magnitude of the time difference between the arrival of the data signal 402 and the hold time threshold 403.

When a data signal 402 arrives at the clock-driven circuit too late, for example, after the setup time threshold 405, as shown in FIGS. 4A and 4D, the clock-driven circuit can be characterized as having negative slack. The magnitude of the negative slack can correspond to a magnitude of the time difference between the arrival of the data signal 402 and the setup time threshold 405.

Returning now to FIG. 3, the place-and-route tool 301 may work in combination with a timing analysis tool 307, for example, to analyze timing of the circuit design 302. In some embodiments, the timing analysis tool 307 can perform a static timing analysis (STA) on the circuit design 302 in various phases of the place-and-route process to determine data arrival timing and clock arrival timing at each of clock-driven circuits in the circuit design 302. In some embodiments, the timing analysis tool 307 can determine propagation delays in data paths corresponding to combinational logic between the clock-driven circuits. The data arrival timing at the clock-driven circuits can be based, at least in part, on the propagation delays in the data paths between the multiple clock-driven circuits.

From this data arrival timing and clock arrival timing, the timing analysis tool 307 can determine amounts of clock skew and slack, among other metrics, in the circuit design 302. The timing analysis tool 307 may be any type of suitable conventional timing tool, which can perform static timing analysis on the circuit design 302.

The static timing analysis can provide various slack metrics, such as Total Negative Slack (TNS), Worst Negative Slack (WNS), Total Hold Slack (THS), and Worst Hold Slack (WHS). Total Negative Slack can be a cumulative sum of the negative slack present in the circuit design 302. Worst Negative Slack can be the individual negative slack measurement having the greatest magnitude in the circuit design 302. Total Hold Slack can be a cumulative sum of the negative hold slack present in the circuit design 302. Worst Hold Slack can be the individual negative hold slack measurement having the greatest magnitude in the circuit design 302.

After the first stage of the clock tree generation, rather than perform an initial balance of the unbalanced clock tree to correct for global skew, as is done conventionally, the clock tree synthesis unit 306 can balance or optimize the unbalanced clock tree based, at least in part, on the data arrival timing relative to the clock arrival timing at the clock-driven circuits in the circuit design 302. For example, the clock tree synthesis unit 306 can initially balance the unbalanced clock tree solely or primarily based on one or more of the slack metrics determined by the static timing analysis. In other words, the clock tree synthesis unit 306 can perform clock tree synthesis (CTS) for the circuit design independent of skew resulting from non-synchronous arrival times for the clock signals at the multiple clock-driven circuits. The initial balancing of the unbalanced clock tree can adjust arrival times of the clocks signals at the different clock-driven circuits in an attempt to have the data signal arrival times fall within the corresponding receive windows of the different clock-driven circuits.

The clock tree synthesis unit 306 can perform this initial balancing through a variety of techniques. For example, the clock tree synthesis unit 306 can insert buffers into the clock tree, which can modify the timing of the clock signal and/or variously group, branch, or cluster of clock-driven circuits in the clock tree. In some instances, the clock tree synthesis unit 306 can work with other units in the place-and-route tool 301 to initially balance the clock tree, for example, by altering one or more data paths between combinational logic or the placement of the combinational logic in the design environment.

After initially balancing the clock tree based on one or more slack metrics, the clock tree synthesis unit 306 can iteratively balance or optimize the clock tree through the performance of additional static timing analysis and additional clock tree synthesis processes until achieving timing closure for the circuit design 302. By initially balancing the unbalanced clock tree solely or primarily based on one or more of the slack metrics determined by the static timing analysis, rather than to correct for global skew as done conventionally, the clock tree synthesis unit 306 can reduce clock tree synthesis balancing iterations. While this clock tree generation process can cause degradation of global skew in the circuit design 302 as compared with a traditional clock tree generation process that first adjusts for global skew before attempting to perform timing closure, by making timing closure an initial target in the clock tree generation process, the overall process can be simplified, which can provide quicker timing closure and improving timing in circuit designs.

As previously noted, various examples of the invention may be implemented by a multiprocessor computing system, such as the multiprocessor computing system 101 illustrated in FIG. 1. Accordingly, one or more components of each of the circuit placement unit 303 and the route placement unit 305 may be implemented using one or more processors in a multiprocessor computing system's master computer, such as the master computer 103, one or more servant computers in a multiprocessor computing system, such as the servant computers 117, or some combination of both. It also should be appreciated that, while the circuit placement unit 303 and the route placement unit 305 are shown as separate units in FIG. 3, a single servant computer (or a single processor within a master computer) may be used to implement both of these modules at different times, or components of both of these modules at different times. In addition, while the place-and-route tool 301 is shown in the illustrated example as being separate from the timing analysis tool 307, in some embodiments, some or all of the functionality of the timing analysis tool 307 may be incorporated into the place-and-route tool 301.

Figure 5:
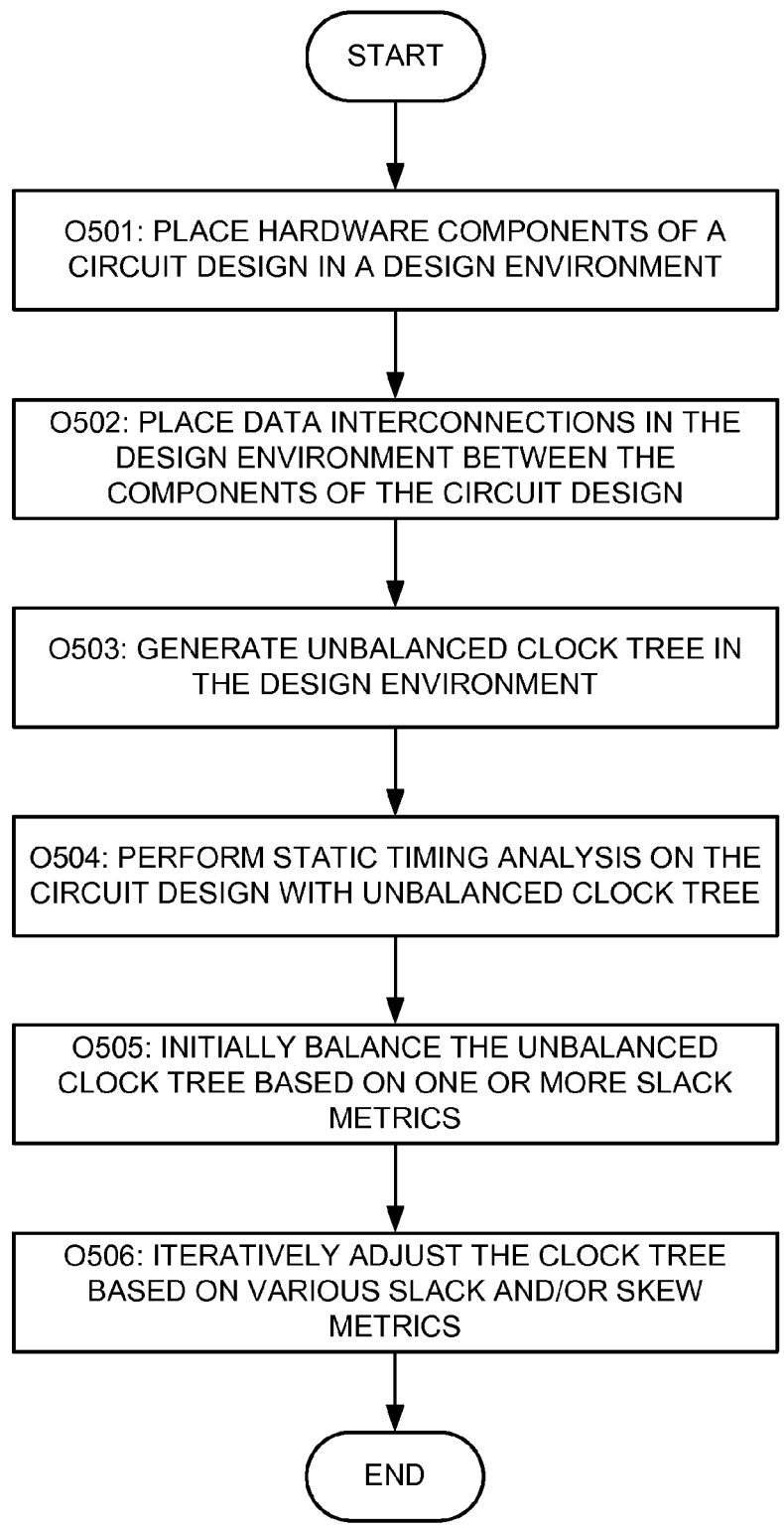
FIG. 5 illustrates a flowchart showing generation of a clock tree in the circuit design according to various examples of the invention.

FIG. 5 illustrates a flowchart showing generation of a clock tree in the circuit design according to various examples of the invention. While the method illustrated in FIG. 5 will be described with reference to the place-and-route tool 301 and the timing analysis tool 307 illustrated in FIG. 3, it should be appreciated that various implementations of the invention may employ variations of a place-and-route tool different from the place-and-route tool 301 and the timing analysis tool 307.

Referring to FIG. 5, initially, in operation 501, the place-and-route tool 301 can place hardware components of a circuit design 302 in a design environment. In some embodiments, the place-and-route tool 301 can include a circuit placement unit 303 to utilize the circuit design 302 to place clock-driven circuits, such as hardware registers, flip-flops, or the like, and combinational logic relative to each other in a design environment. While the clock-driven circuits and the combinational logic can correspond to segments of code in hardware description language, in some embodiments, the clock-driven circuits and the combinational logic can be represented as blocks in a geographic version of the design environment.

In operation 502, the place-and-route tool 301 can place data interconnections in the design environment between the hardware components of the circuit design. In some embodiments, the place-and-route tool 301 can include a route placement unit 305 to place data wiring lines in the design environment, implementing data signal interconnections or data paths between the clock-driven circuits and the combinational logic of the electronic device. The data wiring lines can route data signals between clock-driven circuits and allow the combinational logic to perform logical operations on the data signals propagated between clock-driven circuits.

In operation 503, the place-and-route tool 301 can generate an unbalanced clock tree in the design environment. In some embodiments, the route placement unit 305 can include a clock tree synthesis unit 306 to perform clock tree synthesis and generate the unbalanced clock tree. While the unbalanced clock tree can implement clock signal interconnections or clock signal paths to distribute a clock signal from a root clock source device to each of the clock-driven circuits in the circuit design, these clock signals arrive at the clock-driven circuits with clock skew, for example, due to transmission delays associated with variable distances that the clock signals travel through the unbalanced clock tree to the clock-driven circuits, and with variable amounts of slack, for example, due to a lack of synchronization between the data signal timing and the clock signal timing.

In operation 504, the timing analysis tool 307 can perform static timing analysis on the circuit design with the unbalanced clock tree. The static timing analysis can determine clock arrival timing and data arrival timing at each of the clock-driven circuits. In some embodiments, the timing analysis tool 307 can determine propagation delays in data paths corresponding to combinational logic between the clock-driven circuits, and then determine data arrival timing for the clock-driven circuits based, at least in part, on the propagation delays in the data paths between the multiple clock-driven circuits. From the clock arrival timing and data arrival timing at each of the clock-driven circuits, the static timing analysis can determine various slack metrics, such as Total Negative Slack (TNS), Worst Negative Slack (WNS), Total Hold Slack (THS), and Worst Hold Slack (WHS), of the circuit design 302 with the unbalanced clock tree.

In operation 505, the place-and-route tool 301 can initially balance the unbalanced clock tree based on one or more slack metrics, for example, determined by the timing analysis tool 307 during the static timing analysis. In some embodiments, the clock tree synthesis unit 306 can balance or optimize the unbalanced clock tree based, at least in part, on the data arrival timing relative to the clock arrival timing in the circuit design 302. For example, the clock tree synthesis unit 306 can initially balance the unbalanced clock tree to adjust arrival times of the clocks signals at the different clock-driven circuits in an attempt to have the data signal arrival times fall within the corresponding receive windows of the different clock-driven circuits.

The clock tree synthesis unit 306 can perform this initial balancing through a variety of techniques. For example, the clock tree synthesis unit 306 can insert buffers into the clock tree, which can modify the clock arrival timing. The clock tree synthesis unit 306 can establish multiple branches for a clock signal path in the clock tree to group clock-driven circuits and associated combinational logic into clusters. The location and use of the branches can be determined based on the data or clock arrival timing determined in the static timing analysis, locations of the clock-driven circuits and associated combinational logic relative to the root clock source device, etc.

In some instances, the clock tree synthesis unit 306 can work with other units in the place-and-route tool 301 to initially balance the clock tree, for example, by altering one or more data paths between combinational logic or the placement of the combinational logic in the design environment. This initial balancing of the clock tree by the clock tree synthesis unit 306 can alter the timing the clock signals in an attempt to have the data signal arrival times fall within the corresponding receive windows of the different clock-driven circuits.

In operation 506, the place-and-route tool 301 and the timing analysis tool 307 can work together to iteratively adjust the clock tree after the initial balancing in operation 505 based on various slack and/or skew metrics. For example, after the initial balancing of the clock tree, the timing analysis tool 307 can perform a subsequent static timing analysis to determine the various slack and/or skew metrics. The clock tree synthesis unit 306 can perform an additional balancing of the previously balanced clock tree to improve one or more of the slack and/or skew metrics determined during the subsequent static timing analysis. This subsequent balancing can be repeated until achieving timing closure for the circuit design 302.

Figure 6A:
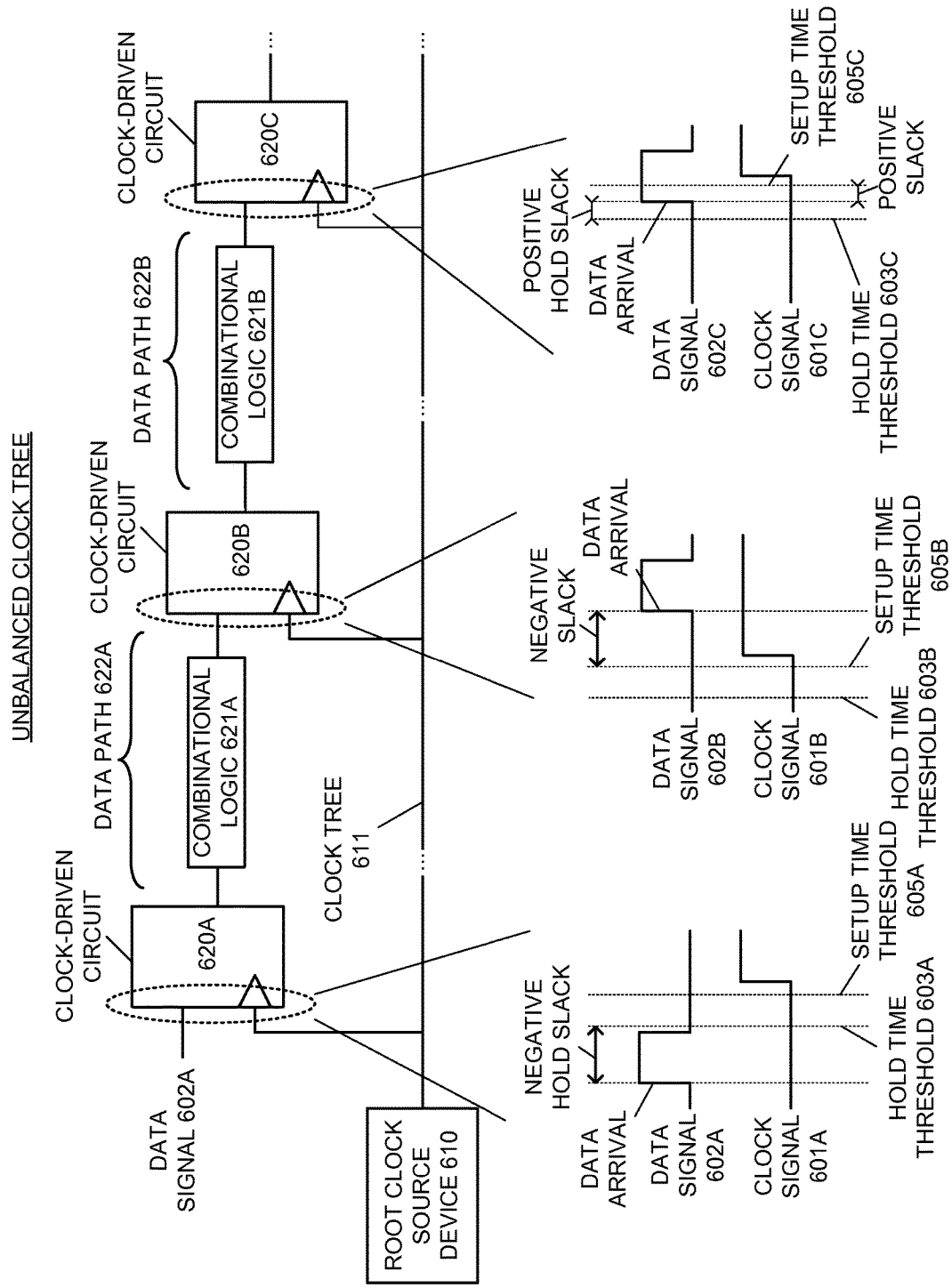
FIGS. 6A and 6B illustrate a portion of a circuit design and corresponding timing diagrams showing an example unbalanced clock tree and an example initially balanced clock tree.
Figure 6B:
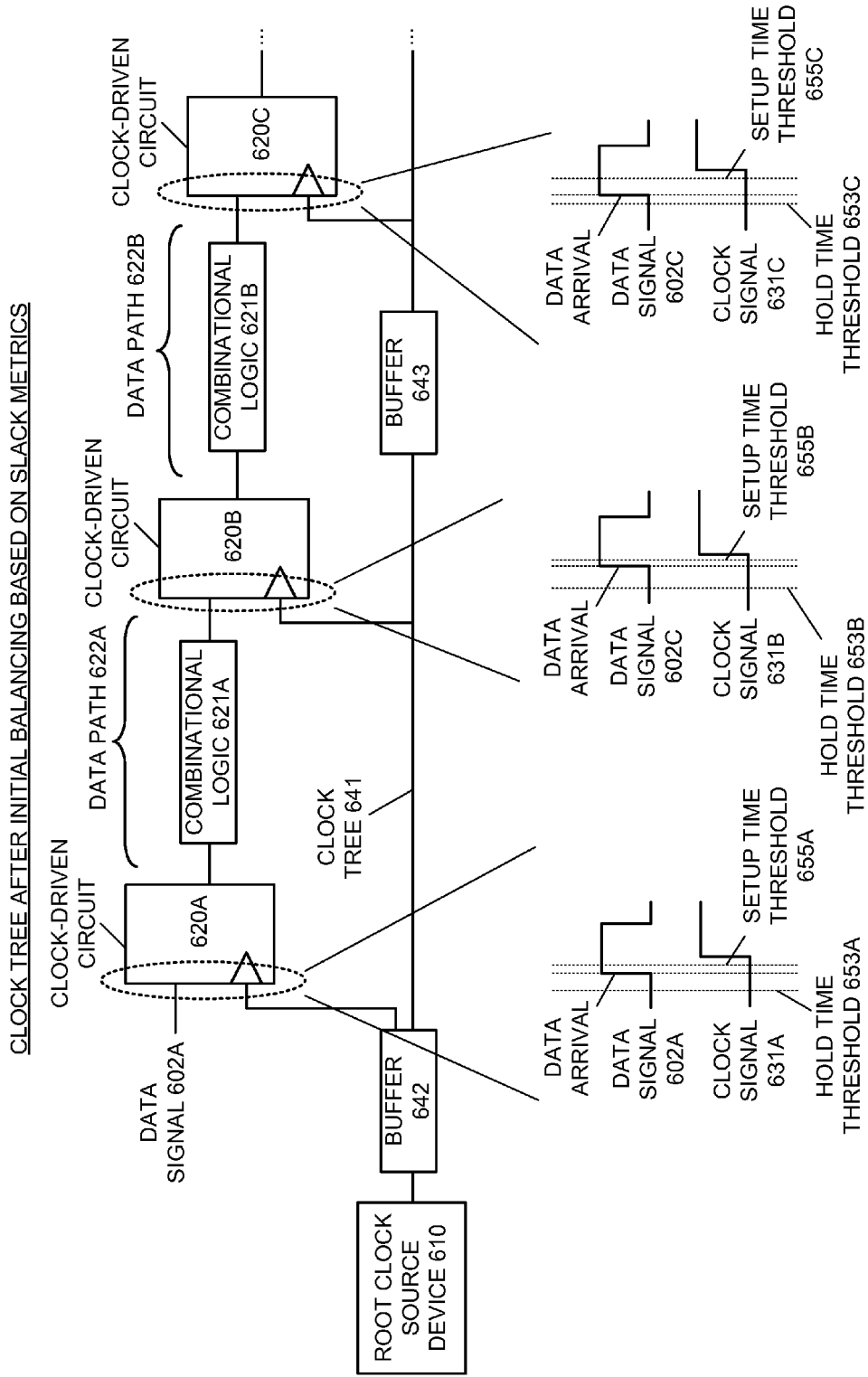

FIGS. 6A and 6B illustrate example representation for a portion of a circuit design in an example geographical design environment along with corresponding clock and data signal timing diagrams. FIG. 6A shows a first stage in clock tree generation, for example, with the circuit design including an unbalanced clock tree 611. Referring to FIG. 6A, the circuit design can include combinational logic 621A-621B coupled between multiple clock-driven elements 620A-620C via data wiring. The data wiring can form a data path 622A between clock-driven circuits 620A-620B through combinational logic 621A, and form a data path 622B between clock-driven circuits 620B-620C through combinational logic 621B.

Each of the clock-driven circuits 620A-620C can receive a clock signal 601A-601C, respectively, from a root clock source device 610 via the unbalanced clock tree 611. The clock-driven circuit 620A can receive a data signal 602A, for example, from another portion of the circuit design or from an input/output (I/O) interface or pin in the circuit design, and latch the data signal 602A in response to the clock signal 601A (or a transition of the clock signal 601A). The clock-driven circuit 620A can provide the latched data signal 601A to combinational logic 621A, which can generate a data signal 602B from the data signal 602A by performing various logical operations as the data signal 601A propagates through the data path 622A.

The clock-driven circuit 620B can receive the data signal 602B from the combinational logic 621A through the data path 622A, and latch the data signal 602B in response to the clock signal 601B (or a transition of the clock signal 601B). The clock-driven circuit 620B can provide the latched data signal 601B to combinational logic 621B, which can generate a data signal 602C from the data signal 602B by performing various logical operations as the data signal 601B propagates through the data path 622B. The clock-driven circuit 620C can receive the data signal 602C from the combinational logic 621B through the data path 622B, and latch the data signal 602C in response to the clock signal 601C (or a transition of the clock signal 601C).

The unbalanced nature of the clock tree 611, i.e., the clock signals 601A-601C can arrive at their respective clock-driven circuits 620A-620C at different times or asynchronously, can cause the clock-driven circuits 620A-620B in the circuit design to be mistimed and fail to properly latch the data in the data signals 602A-602B. For instance, the clock-driven circuit 620A can receive the data signal 602A too early, for example, before a hold time threshold 603A, which can cause a latching failure due to lack of adequate hold time for the data signal 602A after arrival of the clock signal 601A (or a transition of the clock signal 601A). In another example, the clock-driven circuit 620B can receive the data signal 602B too late, for example, after a setup time threshold 605B, which can cause a latching failure due to lack of adequate setup time for the data signal 602B before arrival of the clock signal 601B (or a transition of the clock signal 601B). The clock-driven circuit 620C can receive the data signal 602B within a receive window bounded by a hold time threshold 603C and a setup time threshold 605C, which can allow the clock-driven circuit 620C to latch data signal 602C.

Referring to FIG. 6B, the circuit design shown in FIG. 6B can be similar to the circuit design in FIG. 6A with the following differences. Referring to FIG. 6B, the circuit design in the geographical design environment can show an intermediate (and in some cases final) stage of clock tree synthesis, namely, with a clock tree 641 formed after an initial balancing of the unbalanced clock tree 611 shown in FIG. 6A based on timing metrics.

The initial balancing of the unbalanced clock tree 611 of FIG. 6A based on timing metrics, such as slack metrics, for example, performed by a clock tree synthesis unit 306 in a place-and-route tool 601, can generate the clock tree 641. The clock tree 641 can include multiple buffers 642 and 643, which can alter the timing and/or the routing of the clock signals 631A-631C propagating through the clock tree 641. For example, the buffer 642 in clock tree 641 can receive a clock signal from the root clock source device 610 can create multiple branches, one to provide the clock signal 631A to clock-driven circuit 620A and one to provide the clock signal 631B to clock-driven circuit 620B and the buffer 643. In some embodiments, the buffer 642 also can alter the timing of the clock signal prior to forwarding the clock signal towards the clock-driven circuits 620A and 620B as clock signals 631A and 631B, respectively. The buffer 643 can receive the clock signal 631B from the buffer 642 and alter the timing of the clock signal prior to forwarding the clock signal 631B towards the clock-driven circuit 620C as clock signal 631C.

Since the clock tree 641 has been initially balanced based on slack metrics, such as total negative slack and/or total hold slack, the clock arrival timing of the clock signals 631A-631C received by the clock-driven circuits 620A-620C, respectively, can synchronize with data arrival timing received by the clock-driven circuits 620A-620C, respectively, as shown in the timing diagrams corresponding to the clock-driven circuits 620A-620C. This synchronization, i.e., the data signals 602A-602C falling within receive windows of the clock-driven circuits 620A-620C, respectively, can allow the clock-driven circuits 620A-620C to latch the data in the data signals 602A-602C.

In some embodiments, the clock tree 641 can be configured with buffers to synchronize the clock signals 631A-631C, i.e., so the clock signals 631A-631C are received by their respective clock-driven circuit 620A-620C at the same time, while in other embodiments, the one or more of the clock signals 631A-631C can be asynchronous, which can result in the circuit design having clock skew. Although not shown in FIG. 6B, in some embodiments, the clock tree synthesis performing the initial balancing of the clock tree 611 based solely or primarily on slack metrics also can include adjustment of the data wiring, which can alter the data arrival timing. For example, the data wiring could be adjusted to reroute the clock-driven circuits, move portions of combinational logic 621A into combinational logic 621B, or vice versa, etc.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   determining, by a computing system, data arrival timing and clock arrival timing at multiple clock-driven circuits in a circuit design describing at least a portion of an electronic device; and
   performing, by the computing system, clock tree synthesis (CTS) on the circuit design, which synthesizes an unbalanced clock tree for the circuit design and utilizes the data arrival timing relative to the clock arrival timing at the multiple clock-driven circuits to initially balance the unbalanced clock tree for the circuit design, wherein the initial balancing of the unbalanced clock tree alters a clock signal path in the unbalanced clock tree to provide a clock signal to each of the multiple clock-driven circuits with a new clock arrival timing that is synchronized with the data arrival timing for the multiple clock-driven circuits, and wherein the electronic device is capable of being manufactured based, at least in part, on the circuit design.

2. The method of claim 1, wherein performing clock tree synthesis (CTS) for the circuit design further comprising:
   establishing, by the computing system, multiple branches for the clock signal path to couple a clock source device in the circuit design to each of the multiple clock-driven circuits; and
   inserting, by the computing system, buffers into the clock signal path to selectively delay the clock signal through different branches of the clock signal path.

3. The method of claim 1, wherein performing clock tree synthesis (CTS) that initially balances the unbalanced clock tree for the circuit design is based, at least in part, on a total negative slack (TNS).

4. The method of claim 1, wherein performing clock tree synthesis (CTS) that initially balances the unbalanced clock tree for the circuit design is based, at least in part, on a total hold slack (THS).

5. The method of claim 1, wherein determining the data arrival timing at multiple clock-driven circuits further comprising:
   performing, by the computing system, static timing analysis (STA) on the circuit design having an unbalanced clock tree; and
   determining, by the computing system, propagation delays in data paths between the multiple clock-driven circuits based on the static timing analysis, wherein the data arrival timing at the multiple clock-driven circuits is based, at least in part, on the propagation delays in the data paths between the multiple clock-driven circuits.

6. The method of claim 1, wherein performing clock tree synthesis (CTS) that initially balances the unbalanced clock tree for the circuit design is independent of skew resulting from non-synchronous arrival times for the clock signals at the multiple clock-driven circuits.

7. A system comprising:
   a static timing analysis tool configured to determine data arrival timing and clock arrival timing at multiple clock-driven circuits in a circuit design describing at least a portion of an electronic device; and
   a clock tree synthesis unit configured to perform clock tree synthesis (CTS) on the circuit design, which synthesizes an unbalanced clock tree for the circuit design and utilizes the data arrival timing relative to the clock arrival timing at the multiple clock-driven circuits to initially balance an unbalanced clock tree for the circuit design, wherein the initial balancing of the unbalanced clock tree alters a clock signal path in the unbalanced clock tree to provide a clock signal to each of the multiple clock-driven circuits with a new clock arrival timing that is synchronized with the data arrival timing for the multiple clock-driven circuits, and wherein the electronic device is capable of being manufactured based, at least in part, on the circuit design.

8. The system of claim 7, wherein the clock tree synthesis unit is configured to establish multiple branches for the clock signal path to couple a clock source device in the circuit design to each of the multiple clock-driven circuits, and insert buffers into the clock signal path to selectively delay the clock signal through different branches of the clock signal path.

9. The system of claim 7, wherein the clock tree synthesis unit is configured to perform the clock tree synthesis (CTS) that initially balances the unbalanced clock tree for the circuit design based, at least in part, on a total negative slack (TNS).

10. The system of claim 7, wherein the clock tree synthesis unit is configured to perform the clock tree synthesis (CTS) that initially balances the unbalanced clock tree for the circuit design based, at least in part, on a total hold slack (THS).

11. The system of claim 7, wherein static timing analysis tool is configured to perform static timing analysis (STA) on the circuit design having an unbalanced clock tree and determine propagation delays in data paths between the multiple clock-driven circuits based on the static timing analysis, and wherein the data arrival timing at the multiple clock-driven circuits is based, at least in part, on the propagation delays in the data paths between the multiple clock-driven circuits.

12. An apparatus comprising at least one computer-readable memory device storing instructions configured to cause one or more processing devices to perform operations comprising:
   generating an unbalanced clock tree for a circuit design describing at least a portion of an electronic device; and
   performing clock tree synthesis (CTS) on the circuit design, which synthesizes an unbalanced clock tree for the circuit design and utilizes data arrival timing relative to clock arrival timing at multiple clock-driven circuits in the circuit design having the unbalanced clock tree to initially balance the unbalanced clock tree for the circuit design, wherein the initial balancing of the unbalanced clock tree alters a clock signal path in the unbalanced clock tree to provide a clock signal to each of the multiple clock-driven circuits with a new clock arrival timing that is synchronized with the data arrival timing for the multiple clock-driven circuits, and wherein the electronic device is capable of being manufactured based, at least in part, on the circuit design.

13. The apparatus of claim 12, wherein performing clock tree synthesis (CTS) for the circuit design further comprising:
   establishing multiple branches for the clock signal path to couple a clock source device in the circuit design to each of the multiple clock-driven circuits; and
   inserting buffers into the clock signal path to selectively delay the clock signal through different branches of the clock signal path.

14. The apparatus of claim 12, wherein performing clock tree synthesis (CTS) that initially balances the unbalanced clock tree for the circuit design is based, at least in part, on a total negative slack (TNS).

15. The apparatus of claim 12, wherein performing clock tree synthesis (CTS) that initially balances the unbalanced clock tree for the circuit design is based, at least in part, on a total hold slack (THS).

16. The apparatus of claim 12, wherein the instructions configured to cause one or more processing devices to perform operations further comprising performing static timing analysis (STA) on the circuit design having the unbalanced clock tree to determine the data arrival timing and the clock arrival timing at the multiple clock-driven circuits.

17. The apparatus of claim 12, wherein performing clock tree synthesis (CTS) describing at least a portion of an electronic device for the circuit design is independent of skew resulting from non-synchronous arrival times for the clock signals at the multiple clock-driven circuits.

* * * * *